April 9, 1929.  M. CLAUDE  1,708,831
SPEED REGULATING DEVICE PARTICULARLY APPLICABLE TO BLOWPIPES
Filed Sept. 1, 1927
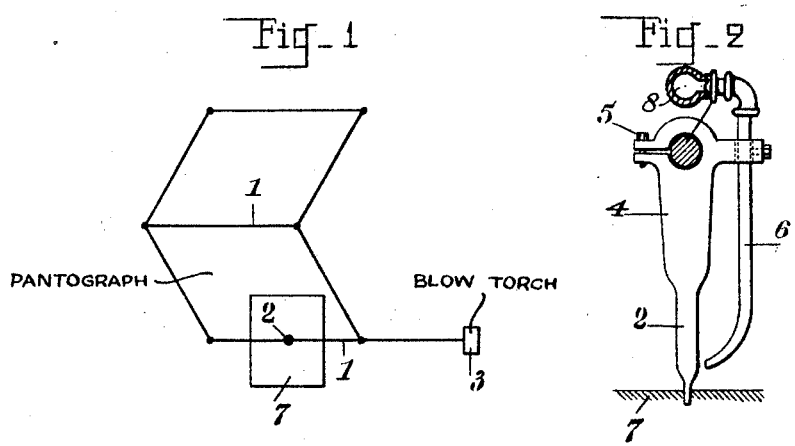
Inventor:
M. Claude Patented Apr. 9, 1929.

1,708,831

UNITED STATES PATENT OFFICE.

MAURICE CLAUDE, OF BOULOGNE-SUR-SEINE, FRANCE.

SPEED-REGULATING DEVICE PARTICULARLY APPLICABLE TO BLOWPIPES.

Application filed September 1, 1927, Serial No. 216,998, and in France September 4, 1926.

When metal of some thickness is to be cut by the blowpipe or torch, it becomes difficult to move the blowpipe forward at a constant speed and without vibrations, and for this reason the cut portion will have an irregular surface.

My invention relates to a method by which all such defects are obviated, and I thus obtain cut surfaces of the most approved character. The invention further relates to apparatus by which the said method is carried into effect.

In the said invention, the blowpipe holder or carrier is provided with a member such as a pointed piece, a slide or the like, which is heated and is inserted to the proper degree into a layer of a substance which melts at the temperature to which the pointed piece is heated. The substance in contact with the pointed piece, slide or the like, will melt at a very regular rate, so that the speed of motion of the said point or slide secured to the blowpipe carrier as it traverses said layer will be limited by the rate of pressure and will be made uniform.

Such material constituting the layer may consist of stearine, with which the surface of the metal is coated, or of any suitable substance.

In the accompanying drawings in which an embodiment of the invention is illustrated, Fig. 1 is a diagrammatic plan view.

Fig. 2 is a cross section through the blow pipe holder and feed pipe, showing the heated point.

The apparatus may consist of a pantograph 1 which carries the blowpipe 3, and the object of which is to cause the blow pipe to reproduce in the metal, on any desired scale, a cut, of the same shape as that depicted or otherwise indicated in a pattern suitably placed beneath the pantograph. The apparatus comprises a rod 4 whose end 2 constituting the pointed piece above referred to is introduced below the surface of the layer 7 of the said fusible substance. The said rod is heated at some distance from its end by a gas burner which is supplied by a pipe 6 branched from the piping 8 employed for feeding the blowpipe device.

This apparatus functions as follows:—

The point 2 having been raised to a temperature sufficiently high, begins to melt the material with which its end makes contact gradually as it is displayed. It is understandable that if one raises the point 2 to a suitable temperature, but not too high, this fusion of the material takes place proportionately to the advance of the point 2, and that it finds itself in the direction of its displacement, always in contact with the material not yet fused; if the speed of travel of the blow torch increases sharply, the point 2 runs up against the resistance of the material, yet solid. This cannot melt any faster than the rate at which the point 2 is able to displace itself. One finds therefore an acceleration in the speed of the blow torch and thus its rate of speed is regulated.

This method and this apparatus can be made use of for controlling the speed of all moving apparatus.

I claim—

1. A device for regulating the speed of a cutting torch comprising in combination, a layer of fusible material, a member fixed with respect to said torch constructed to penetrate said layer of material when the latter is in fused condition locally adjacent said member, and heating means for maintaining said member at such temperature as to produce the desired rate of fusion of said material.

2. A device for regulating the speed of a cutting torch comprising, in combination, a layer of fusible material, a member fixed with respect to said torch constructed to penetrate said layer of material when the latter is in fused condition locally adjacent said member, heating means for maintaining said member at such temperature as to produce the desired rate of fusion, and a conduit for supplying gas to said torch having a branch for supplying gas to said heating means.

3. A device for regulating the speed of a cutting torch, comprising in combination, a layer of fusible material, a pantograph governing the movements of said torch, a pointed member fixed with respect to an element of said pantograph and adapted to penetrate said layer of fusible material when the latter is in fused condition locally adjacent said pointed member, and heating means for maintaining said pointed member at such temperature as to produce the desired rate of fusion of said fusible material.

Signed at Paris, this 22nd day of August, 1927.

MAURICE CLAUDE.